(12) United States Patent
Penumarthi et al.

(10) Patent No.: US 12,001,313 B2
(45) Date of Patent: Jun. 4, 2024

(54) TIME SERIES FORECASTING

(71) Applicant: Zoho Corporation Private Limited, Chengalpattu Taluk (IN)

(72) Inventors: Satya Madhuri Penumarthi, Vijayawada (IN); Ramprakash Ramamoorthy, Maraimalai Nagar (IN); Shailesh Kumar Davey, Potheri (IN)

(73) Assignee: Zoho Corporation Private Limited, Chengalpattu Taluk (IN)

( * ) Notice: Subject to any disclaimer, the term of this patent is extended or adjusted under 35 U.S.C. 154(b) by 237 days.

(21) Appl. No.: 17/216,614

(22) Filed: Mar. 29, 2021

(65) Prior Publication Data
US 2021/0326235 A1    Oct. 21, 2021

Related U.S. Application Data

(60) Provisional application No. 63/083,054, filed on Sep. 24, 2020.

(30) Foreign Application Priority Data

| Apr. 1, 2020 | (IN) | ................... 202041014507 |
| May 12, 2020 | (IN) | ................... 202041020012 |
| Jun. 12, 2020 | (IN) | ................... 202041024680 |

(51) Int. Cl.
*G06F 11/34* (2006.01)
*G06F 17/14* (2006.01)
*G06F 17/18* (2006.01)

(52) U.S. Cl.
CPC ...... *G06F 11/3452* (2013.01); *G06F 11/3409* (2013.01); *G06F 11/3447* (2013.01); *G06F 17/142* (2013.01); *G06F 17/18* (2013.01)

(58) Field of Classification Search
CPC ............ G06F 11/3409; G06F 11/3447; G06F 11/3452; G06F 17/142; G06F 17/18; G06N 20/00
See application file for complete search history.

(56) References Cited

U.S. PATENT DOCUMENTS

| 7,610,214 | B1 * | 10/2009 | Dwarakanath | ..... G06Q 30/0202 |
| | | | | 705/7.31 |
| 11,061,934 | B1 * | 7/2021 | Xue | ........................ G06F 17/14 |
| 2017/0364851 | A1 * | 12/2017 | Maheshwari | .... G06Q 10/06314 |
| 2018/0299375 | A1 * | 10/2018 | Young | ..................... F01M 11/10 |
| 2020/0218776 | A1 * | 7/2020 | Shah | ....................... G06F 17/18 |
| 2020/0242483 | A1 * | 7/2020 | Shashikant Rao | ....... G06N 5/01 |

OTHER PUBLICATIONS

Cleveland, Robert B. et al., "STL: A Seasonal-Trend Decomposition Procedure Based on Loess," Journal of Official Statistics, vol. 6, No. 1, Mar. 1990.

* cited by examiner

*Primary Examiner* — Yoshihisa Ishizuka
(74) *Attorney, Agent, or Firm* — Ahmann Kloke LLP

(57) ABSTRACT

A method and system for time series forecasting are described. Forecasting a time series, though uncertain, has a potential to improve decision-making. It gives a picture of what can probably be expected. A live time series typically has trend and seasonality as its innate characteristic features, randomness being obvious in real-time. Described embodiments address complexity in configuring zero-configuration workflow forecasting methods at production scale. Described embodiments address complexity in configurating domain independent forecasting methods at production scale.

23 Claims, 5 Drawing Sheets

TIME SERIES FORECASTING

CROSS-REFERENCE TO RELATED APPLICATIONS

The present application claims priority to Indian Provisional Patent Application No. 202041014507 filed Apr. 1, 2020, Indian Provisional Patent Application No. 202041020012 filed May 12, 2020, Indian Provisional Patent Application No. 202041024680 filed Jun. 12, 2020, and U.S. Provisional Patent Application Ser. No. 63/083,054 filed Sep. 24, 2020, which are incorporated by reference herein.

SUMMARY

A time series can be forecasted using pure statistics, machine learning, and/or deep learning. Forecast modeling needs higher levels of investigation on the characteristics of the time series before arriving at a befitting approach. After practically learning that neither one single method nor a set of methods with domain specific applicability can deal with different patterns efficiently at a production scale, a configuration-free domain independent time series forecasting engine is constructed. A comprehensive research in this field helped to seamlessly sew a variety of diagnostic techniques, forecasting techniques and performance indicators to deploy an ensemble forecasting engine which can handle any time series irrespective of domain and granularity. The engine generates forecasts with high levels of accuracy across domains at the production scale.

As discussed below with respect to FIG. 4B, Comparative Analysis showed that the Time Series Forecast Engine outperformed when benchmarked with solutions provided by Tableau and R (a programming language for statistical analysis).

Forecasting a time series, though uncertain, has a potential to improve decision-making. It gives a picture of what can probably be expected. A live time series typically has trend and seasonality as its innate characteristic features, randomness being obvious in real-time. In a specific implementation, configuring forecasting methods at production scale is simplified, even without access to domain knowledge, which reduces data storage, computation, and time relative to academic and industry benchmarks. In a specific implementation, forecasting methods at production scale can be implemented as a zero-configuration workflow.

DETAILED DESCRIPTION

Figure 1:
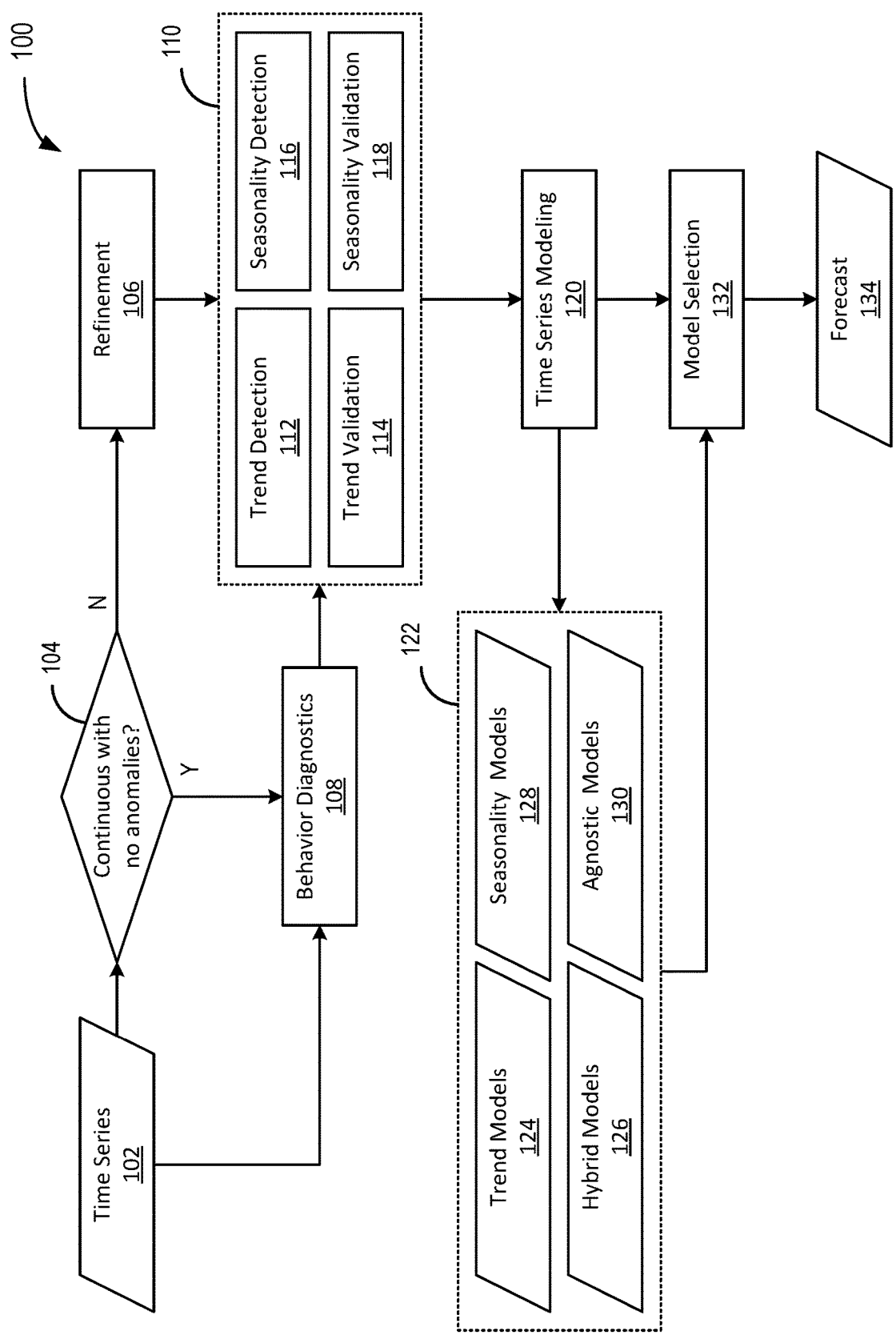
FIG. 1 depicts a flowchart of an example of a method of time series forecasting.

FIG. 1 depicts a flowchart 100 of an example of a method of time series forecasting. A metric collected at equal intervals of time accounts to a time series. Properties of the time series depend on the nature of metric, e.g., how it behaves over time.

Some observable characteristics of a time series include trend and seasonality. A trend is an upwards or downwards shift in a data set over time or, equivalently, an increase or decrease in the metric over time. In time series data, seasonality is the presence of variations that occur at specific regular intervals, such as hourly, daily, weekly, monthly, quarterly, yearly, biannually, or some other interval, and are sometimes contrasted with cyclical patterns. (Cyclical patterns occur when the data exhibits rises and falls that are not of a fixed period.) As used in this paper, unless context requires otherwise, seasonality is not intended to include cyclical patterns. Each season can have its own trend, too, apart from an overall trend, which can be referred to as a seasonal trend. There can be multiple valid seasonal behaviors along a series.

The flowchart 100 starts with time series 102 and continues to decision point 104 where it is determined whether the time series is continuous with no anomalies.

Stage 0: Time Series Refinement (Pre-Processing)

If it is determined the time series is either not continuous or has anomalies (104—N) then the flowchart 100 continues to module 106 for refinement. A discontinuity is detected when a time series is missing values, which can occur, for example, when data collection is interrupted. An anomaly is detected when there is a rise or fall at unexpected time (or within timeframe) essentially beyond white noise. Time series refinement includes filling in missing values in line with a least most recurring interval. Filling up of missing values can be processed by single point refinement or episode refinement. A time series can be referred to as a refined time series when a discontinuity or discontinuities have been addressed with single point refinement or episode refinement or an anomaly or anomalies have been smoothed out with single point refinement or episode refinement.

Single point refinement includes 1) Insertion with average of valid preceding and succeeding points and 2) Deletion after inducing possible effect into a next succeeding point. Episode refinement includes 1) Insertion by extrapolating via Inverse Fast Fourier Transform (IFFT) and 2) Deletion by spreading the effect along valid preceding and succeeding points contextually. Using these techniques, discontinuities and anomalies of a data set can be detected and the data set can be refined using single point refinement or episode refinement, whichever is applicable. The refinement strategies can also be applied to samples qualifying a 2-sigma factor anomaly smoothing limit, so as to restrain them from learning.

Stage 1: Behavioral Diagnostics

If, on the other hand, it is determined the time series is continuous with no anomalies (104—Y) then the flowchart 100 continues to module 108 for behavior diagnostics. Behavioral diagnostics provides a preliminary identification of behavioral properties of a time series. For example, behavioral diagnostics can detect and validate the presence of trend and seasonality for a time series. In a specific implementation that includes trend diagnostics, trend is detected by fitting simple regression on scaled time series and validated using slope tolerance thresholding. In a specific implementation that includes seasonality diagnostics, seasonality is detected by generating seasonality profile by applying a Fast Fourier Transform (FFT) technique to the refined (and detrended, if applicable) time series and validated by thresholding on the rank from Singular Value Decomposition (SVD) of a trajectory matrix framed using each season.

The flowchart 100 continues from modules 106 and 108 to module 110 where behavioral diagnostics guide in switching to a suitable set of models for raw and/or refined time series data sets. Presence of trend is detected and validated by thresholding upon a slope of linear regression fit over scaled time series. Seasonality profile is estimated using spectral analysis and each season is validated by thresholding on a rank of decomposed corresponding trajectory matrix. Module 110 includes submodules trend diagnostics detection 112, trend validation 114, seasonality diagnostics detection 116, and seasonality validation 118. In a specific implementation, each of the four modules is employed for each time series data set. It may be noted, however, that not all data sets have trends and/or seasonality.

Trend diagnostics detection includes 1) Refined time series→Min-Max Scaling→Simple Regression and 2) Estimating a non-zero slope indicates presence of trend. Trend validation includes slope tolerance thresholding. Seasonal diagnostics detection includes 1) Refined time series→Detrend (if diagnosed previously)→Fast Fourier Transform-→Seasonality profile generation. Seasonal validation includes thresholding on rank from Singular Value Decomposition (SVD) of trajectory matrix framed using each season to be validated. SVD can be summarized as a mathematical procedure to elucidate unique solutions to the system of linear equations given, each season in this context; depending on the number of solutions and the variability among them, the season is validated.

Stage 2: Time Series Modelling

After figuring out the nature of the data (e.g., whether the data has either trend or seasonality or both) the flowchart 100 continues to module 120 with time series modeling for model subset selection at module 122. For illustrative purposes, the module 122 includes trend models 124 for modeling rate of change, hybrid models 126 for modeling rate of change along with seasonal patterns, seasonality models 128 for modeling seasonal patterns, and pseudo-random pattern models 130 for approximating randomness. The trend model subset is selected when the refined time series includes detected trends, the seasonality model subset of models is selected when the refined time series includes detected seasonality, the hybrid model subset of models is selected when the time series includes both detected trends and detected seasonality, and the pseudo-random pattern model subset of models is selected when the time series has no identified trends or seasonality Models listed in module 122 include at least one and/or more regression models that can capture a relationship between a generated serial stamp during Stage 0 and the metric, STL (Seasonal-Trend decomposition recursive procedure based on LOESS) based models to decompose the given time series into its trend, seasonal, and residual components, cascaded with Spectral/Regression/ARIMA models, ETS (Explicit handling of Trend and Seasonality) models that can learn level, trend and seasonality individually or as combinations, and ARIMA (Auto-Regressive Integrated Moving Average) models to extract behaviors in the time series sequentially.

In a specific implementation, the trend models 124 include regression models (linear, logarithmic, exponential, power, polynomial), Explicit handling of Trend and Seasonality (ETS) models (Simple ES, Brown's Linear ES, Holt's Additive Double ES (+damped), Holt's Multiplicative Double ES (+damped)), and Auto-Regressive Integrated Moving Average (ARIMA) models (Arima (p,d,q)). In a specific implementation, the hybrid models 126 include Seasonality-Trend Locally weighted scatterplot smoothing (STL) based models (additive, multiplicative), ETS models (Simple ES, Holt Winter's Additive Trend (+damped) Additive Season ES, Holt Winter's Additive Trend (+damped) Multiplicative Season ES, Holt Winter's Multiplicative Trend (+damped) Additive Season ES, Holt Winter's Multiplicative Trend (+damped) Multiplicative Season ES), regression (linear, logarithmic, exponential, power, polynomial), and ARIMA (sARIMA(p,d,q)S(P,si,Q)). In a specific implementation, the seasonal models 128 include STL (additive, multiplicative) models, ETS (Simple ES, Simple Additive Season ES, Simple Multiplicative Season ES) models, and ARIMA (sARIMA S(P,si,Q)) models. In a specific implementation, the pseudo-random models 130 include ETS (Simple ES) model, regression (linear, logarithmic, exponential, power, polynomial) models, and ARIMA (ARIMA (p,d,q)) models.

Regression

Regression is a data science approach to create a model in order to understand the relationship between variables. In the case of time series forecasting, it is attempted to capture a relationship between a generated serial stamp during Stage 0 (instead of timestamp itself) and a metric. So, once a model is created, forecast can be generated based on granularity. The relationship between timestamp and metric is uncertain. To overcome this and to fit the model that can capture metric's true behavior, different regression models are estimated, linear, logarithmic, exponential, power and polynomial (in a specific implementation, up to the 7th degree). Model with the highest adjusted R-squared value is selected as a best fit.

STL Decomposition Cascaded with Spectral/Regression/ARIMA Models

STL is a seasonal-trend decomposition recursive procedure based on loess (Locally Weighted Scatter Plot Smoother) which needs seasonality information to yield trend, seasonal and random components. It is a known statistical procedure first introduced in 1990. See Cleveland, R. B., Cleveland, W. S., McRae, J. E. and Terpenning, I., 1990. STL: A seasonal-trend decomposition. Journal of official statistics, 6(1), pp. 3-73. This is expected to decompose the given time series into its trend, seasonal, and residual components.

In a specific implementation, STL is employed to extract trend and seasonal components from a series with detected predominant frequency. Like other decomposition techniques, collecting a residual component prevents data loss and can contain random behavior, noise and secondary seasons, thereby increasing scope for modeling secondary seasons contributing to generate precise predictions. Anomalies, if still present, are flattened while decomposing. Each of the decomposed components will then be extrapolated using suitable forecasting procedures.

Trend component will be forecasted with variants of regression, namely, linear, logarithmic, exponential, power and polynomial, out of which the forecast with highest adjusted R-squared value is considered for further modeling. Predominant seasonal component is either temporally or spectrally reproduced, while secondary seasonal components are taken care of by cascading with a spectral model. Residual component is subjected to variants of regression as well as simple and seasonal ARIMA estimations, out of which the best performing model, e.g., with lower Root Mean Squared Error (RMSE), is finalized. Two collective models will then be framed as a second validation level, additive and multiplicative. Additive model will correspond to the addition of extrapolated trend, seasonal and residual components and so, the multiplicative as its name suggests.

ETS (Explicit Handling of Trend and Seasonality)

A set of 16 exponential smoothing techniques have been equipped out of which certain subsets align with diagnostics. Akaike Information Criterion is used as a performance indicator to choose the best fit from them. Each of these ETS models are re-grouped and briefly explained below:

1. Single/Simple Exponential Smoothing—A simple technique using a single smoothing parameter specialized for a time series without any observable trend and seasonality. This parameter can be referred to as a level smoothing factor ranging between 0 and 1, which accelerates learning when closer to 1 and enables most recent values to influence the forecast more.

2. Double Exponential Smoothing—Extended simple ES with support for trend using another smoothing parameter for controlling the decay in influence of changes on trend along historical data. Brown's Linear ES model is a special form wherein both the parameters smoothen the trend itself. Holt's Additive Double ES is for series having additive trend, while Holt's Multiplicative Double ES is for multiplicative trend. Dampening models are also formulated for the latter two.

3. Triple Exponential Smoothing—Popularly known as Holt Winter's ES, it is an extended double ES with support for seasonal variations incorporating another parameter that controls influence of seasonal component. Possible combinations of additive/multiplicative/dampening models over trend and seasonality are explored (as listed above with reference to FIG. 1).

ARIMA (Auto-Regressive Integrated Moving Average)

A conventional approach to time series modeling that relies on successive transformations until white noise or the original signal of underlying data generation process is extracted. It employs auto-regression process and moving averages to propagate nature of the series along with probable errors to predict.

The given series is first diagnosed for deterministic and stochastic trends. Trend that can be quantified is said to be deterministic trend and can be removed by slope detrending. On the other hand, trend which cannot be quantified globally accounts to stochastic nature and can be removed by successive differencing. Optimal order for successive differencing (usually denoted by "d") is found by monitoring the decay rate of standard deviation and performing Augmented Dickey-Fuller test. Seasonality profile (S={s1, s2, . . . , ss}) generated using spectral analysis, already described above as an integral part of behavior diagnostics, is exploited to adjust the series by seasonal differencing, thereby removing the obvious repetitive effects. The series can be subjected to log transformation as well, whenever necessary, since ARIMA is predominantly an additive model.

The next step is to find optimal orders for auto-regression and moving average propagation. This can be achieved by screening Auto-Correlation Factor (ACF) and Partial ACF (PACF) values against possible lags for trend stationarized signal. Evaluating auto-correlation helps in figuring out the number of past values, that the current value depends on. A positive lag-1 ACF suggests adding an AR term to model while the actual optimal number of AR terms (usually denoted by "p") is the lag at which PACF cuts off below 95% confidence. A negative lag-1 ACF suggests adding an MA term to model while the actual optimal number of MA terms (usually denoted by "q") is the lag at which ACF cuts off below 95% confidence.

Once the required pre-requisite orders mentioned above (p,d,q) are optimized, model parameters are estimated. AR terms are the coefficients of multiple regression on past "p" trend stationary values. MA processes are designed to capture dependence of prediction on past errors approximated using Innovations algorithm, which are otherwise unobserved in reality. Each predominant season, "s" can be modeled separately in the same fashion, followed by sequential consolidation. Reconstruction using the above mentioned parameters and relevant past observations/errors gives a prediction believed to belong to the same data generation process.

Stage 3: Model Selection

The flowchart 100 continues to module 132 with model selection. After selecting a subset of models based on behavior diagnostics, they are run in parallel, which avoids time lag from running them one after the other. In a specific implementation, each model that is run in parallel is independent of each other model that is run in parallel. Model independence is possible because each model is designated to model the combination of trend and seasonality in a specific way. Performance is evaluated once all the parallel processes are accomplished. A suite of performance indicators, such as RMSE (Root Mean Square Error), LEPS (Linear Error in Probability Space), MAPD (Mean Absolute Percentage Deviation), AICc (corrected Akaike Information Criterion), and BIC (Bayesian Information Criterion) are used to aid in selection of an estimated best forecast model for a data set. Ultimately, the best (highest performance) forecast model is selected by comparing performance after the parallel processes are completed.

Stage 4: Forecast Reporting

The flowchart 100 continues to module 134 with forecast reporting. The best estimated best forecast model was selected at module 132 and a forecast is generated using the estimated best forecast model. In a specific implementation, prediction and confidence margins are estimated using MSE (Mean Squared Error) and SE (Standard Error) factor at different confidence levels (70%, 75%, 80%, 85%, 90%, 95% and 99%), so as to project a band, thereby bringing uncertainty into the same view. It is preferable to not generate more than half of a learning dimension owing to validity given real-time dynamics.

Advantageously, because of stacking different time series models together, time series forecasting as described in this paper is accomplished without a priori domain knowledge. Moreover, because of refinement and behavior diagnostics, time series forecasting can be implemented as part of a zero-configuration workflow.

Use Case Example:

Consider the daily revenue of a decade old company, "Z" recorded. There can be a steep increase in first few months owing to building a new customer base, after which say, 15% growth year by year. It can also have recurring weekly patterns (might be low during mid-week or typical Sunday) and yearly patterns (might rise every December), apart from daily fluctuations. In this scenario, annual growth is expected to be captured as trend along with weekly and monthly behavior as 2 prominent seasons in the seasonality profile. This accounts to behavior diagnostics which can then aid in narrowing down to a subset of forecasting techniques that could be applicable.

In a product like ZOHO ANALYTICS® business intelligence and data analytics software, there is hardly any prior knowledge on the nature of a time series data set; the data set is essentially just a sequence of numbers. Advantageously, techniques described in this paper enable analysis of a time series at industry scale because they can be implemented 1) domain-independent and 2) as a zero-configuration workflow. Data could be as superficial as yearly population count or as sensitive as heart beats recorded every minute. A domain-independent, configuration-free time series forecasting engine can be implemented as a one-for-any design without compromising on accuracy. Moreover, it can give a reasoning for a forecast in terms of learned trend and seasonality.

Figure 2:
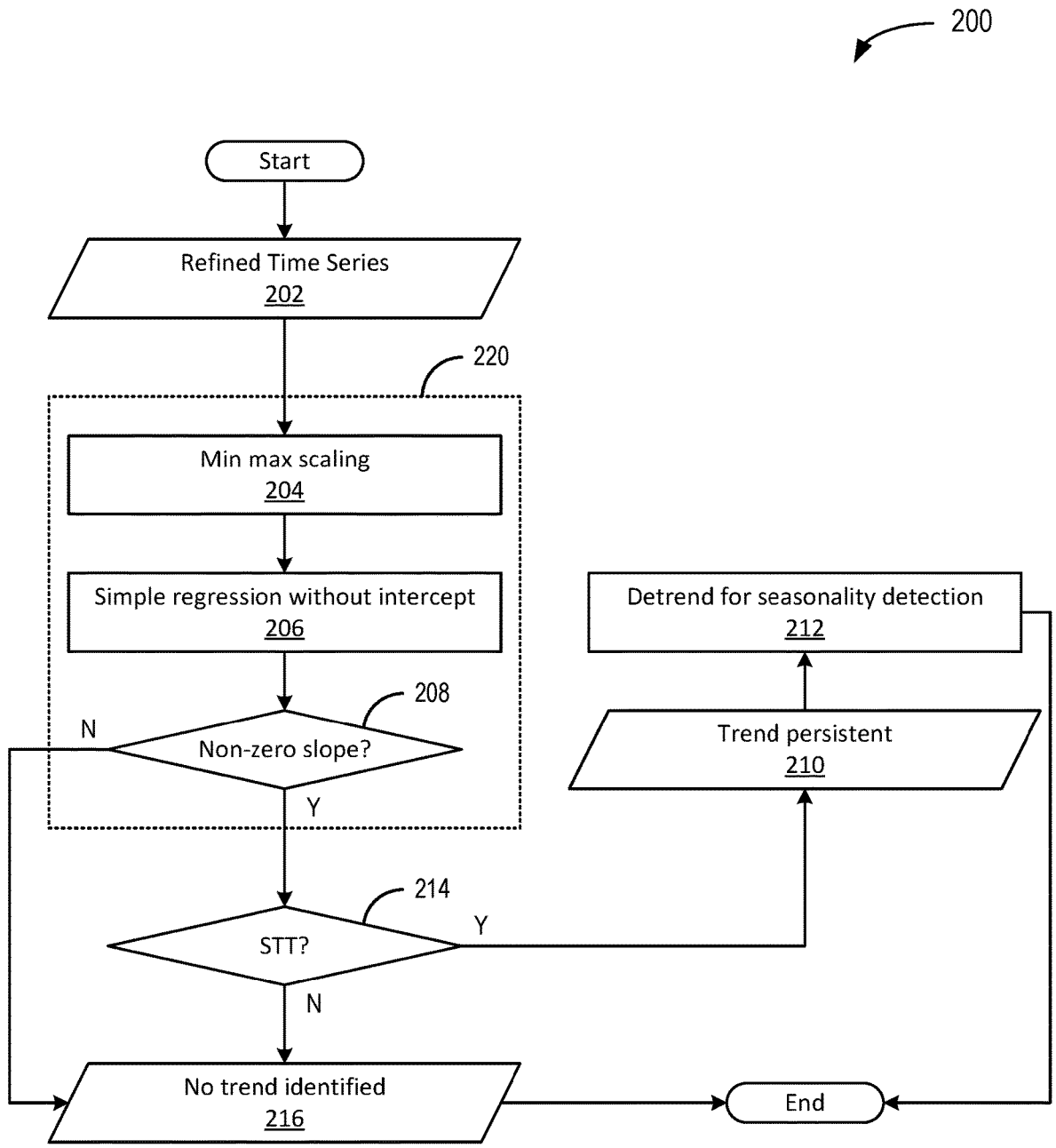
FIG. 2 depicts a flowchart of an example of trend presence detection and validation.

FIG. 2 depicts a flowchart 200 of an example of trend presence detection and validation. The flowchart 200 starts with a refined time series Tr={t1, t2, ..., tn} (module 202), where 'n' represents the number of samples (available/recorded). The flowchart 200 continues to module 204 with min-max scaling, to module 206 with simple regression without intercept, and to decision point 208 where it is determined whether the time series has a non-zero slope. If it is determined the time series does not have a non-zero slope (208—N), then the flowchart 200 ends at module 216 with no trend identified.

If, on the other hand, it is determined the time series has a non-zero slope (208—Y), then the flowchart 200 continues to decision point 214, Slope Tolerance Thresholding (STT) where it is determined whether the time series meets a slope tolerance threshold. If it is determined the time series meets a slope tolerance threshold (214—Y), then the flowchart 200 continues to module 210, which indicates a trend is persistent, and ends at module 212 with detrending for seasonality detection. If, on the other hand, it is determined the time series does not meet a slope tolerance threshold (214—N), then the flowchart 200 ends at module 216 with no trend identified.

For illustrative purposes, the box 220, which encompasses module 204, module 206, and decision point 208, represents a trend diagnostics detection portion of the flowchart 200. The decision point 214 represents a trend validation portion of the flowchart 200. The module 212 is intended to illustrate detrending is appropriate prior to seasonality detection but can be considered part of a seasonality detection and validation method, rather than a part of a trend detection and validation method as depicted in the example of FIG. 2.

Figure 3:
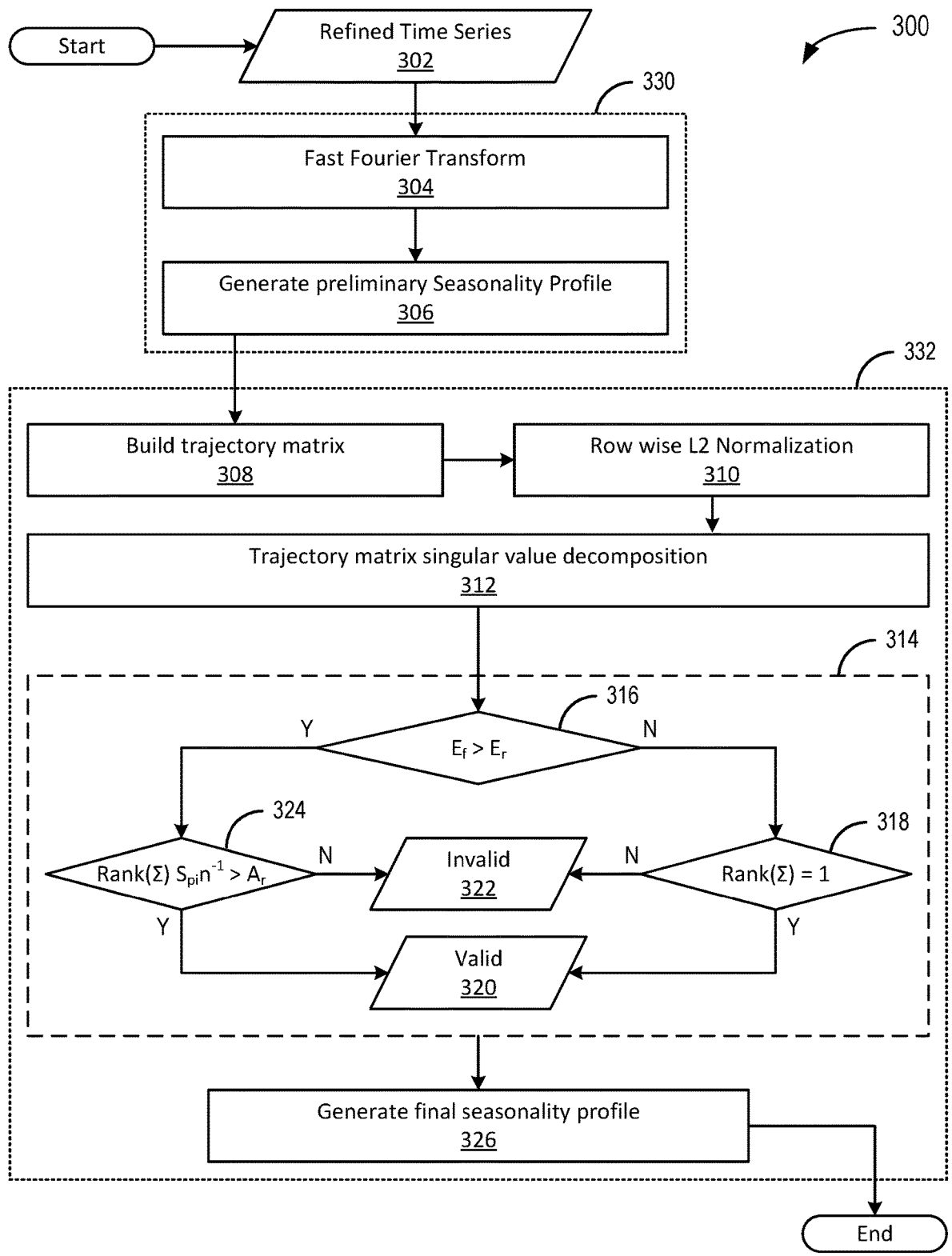
FIG. 3 depicts a flowchart of an example of seasonality presence detection and validation.

FIG. 3 depicts a flowchart 300 of an example of seasonality presence detection and validation. The flowchart 300 starts with a refined time series Tr={t1, t2, ..., tn} (module 302) and continues to module 304 with Fast Fourier Transform (FFT) and to module 306 with generating preliminary seasonality profile. The preliminary seasonality profile can be defined as Sp={sp1, sp2, ..., spn'} where n'<=n/2. For illustrative purposes, the box 330, which encompasses modules 304 and 306 represents a seasonality diagnostics detection portion of the flowchart 300. The seasonality diagnostics detection portion could also include a detrend if applicable module (not shown but see, e.g., FIG. 2).

The flowchart 300 continues to module 308 with building a trajectory matrix, to module 310 with row wise L2 normalization, to module 312 with singular value decomposition of trajectory matrix, and to box 314. The trajectory matrix, MT, can be built by arranging Tr in rows of spi. For example, a first row can be represented as [t1, t2, ..., tspi], a second row as [tspi+1, tspi+2, tspi*2], ..., and a final row as [tspi*n−spi, tspi*n−spi+1, tspi*n]. (Note: tn and tspi*n are equivalent.) The singular value decomposition of the trajectory matrix can be defined as MT=UΣVT. The box 314, which encompasses decision points 316, 318, and 324 and modules 320 and 322, is intended to represent comparing Fourier entropy with randomness tolerance and evaluating rank of singular matrix, which typically involves multiple Rank (Σ) comparisons.

The flowchart 300 continues from module 312 to decision point 316 where it is determined whether Fourier entropy is greater than randomness tolerance. If it is determined Fourier entropy is not greater than randomness tolerance (316—N), then the flowchart 300 continues to decision point 318 where it is determined whether Rank(Σ)=1. If it is determined Rank(Σ)=1 (318—Y), then the flowchart 300 continues to module 320 where a validity determination is made. If, on the other hand, it is determined Rank(Σ)≠1 (318—N), then the flowchart 300 continues to module 322 where an invalidity determination is made. It may be noted the modules 320 and 322 do not have an arrow from them but the flowchart 300 eventually continues from box 314 to module 326 after all applicable determinations have been made.

If, on the other hand, it is determined Fourier entropy is greater than randomness tolerance (316—Y), then the flowchart 300 continues to decision point 324 where it is determined whether Rank(Σ)*Spin−1>Ar. If so (324—Y), then the flowchart 300 continues to module 320 where a validity determination is made. If not (324—N), then the flowchart 300 continues to module 322 where an invalidity determination is made.

After all applicable determinations in box 314 have been made, the flowchart 300 ends at module 326 with generating a final seasonality profile, S. The final seasonality profile can be defined as S={s1, s2, ..., sm}. For illustrative purposes, the box 332, which encompasses module 308, module 310, module 312, box 314, and module 326, represents a seasonality validation portion of the flowchart 300.

Figure 4A:
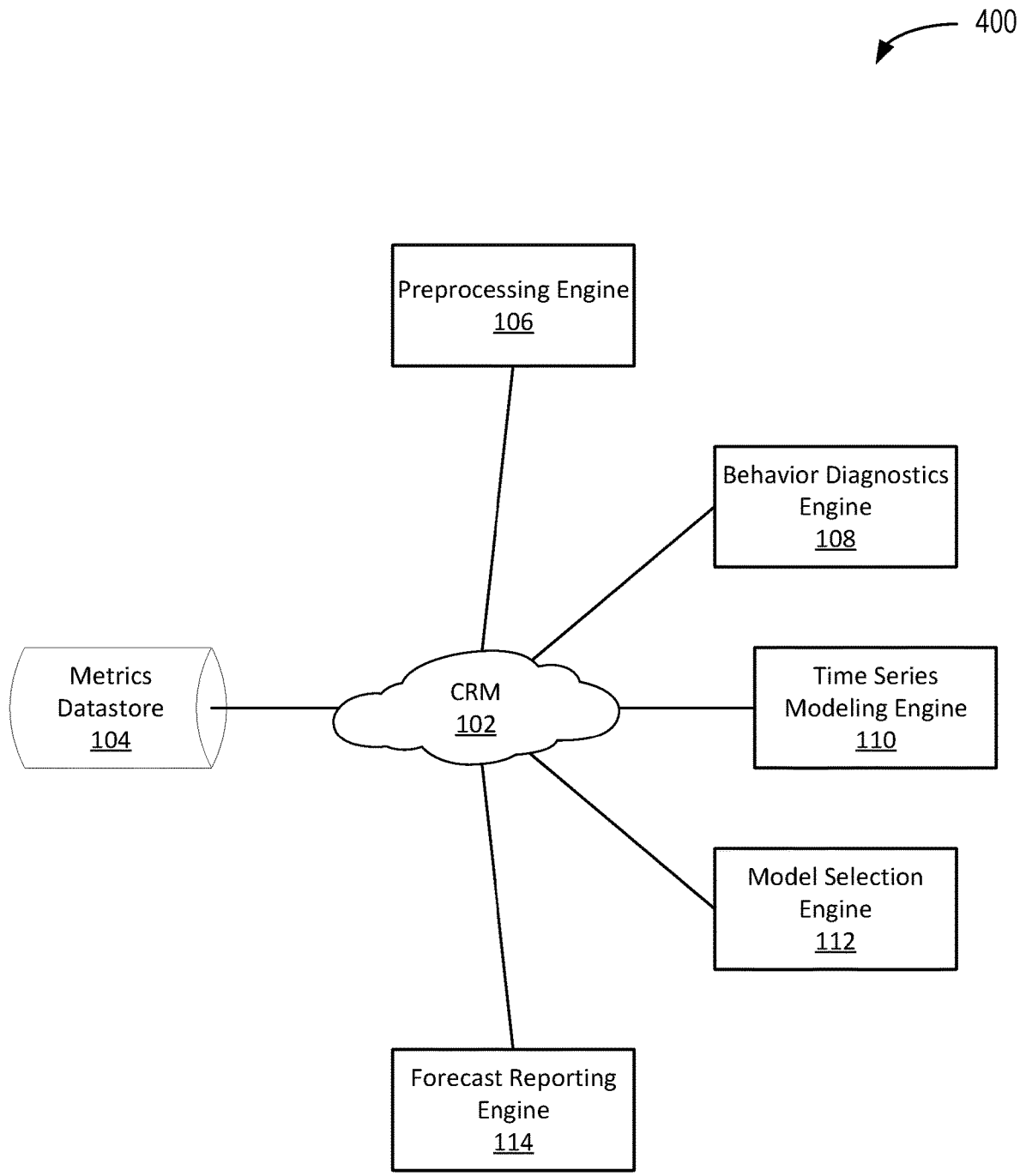
FIG. 4A depicts a diagram of an example of a time series forecast engine.

FIG. 4A depicts a diagram 400 of an example of a time series forecast system. The diagram includes a computer readable medium (CRM) 402, a metrics datastore 404 coupled to the CRM 402, a time series refinement engine 406 coupled to the CRM 402, a behavior diagnostics engine 408 coupled to the CRM 402, a time series modeling engine 410 coupled to the CRM 402, a model selection engine 412 coupled to the CRM 402, and a forecast reporting engine 414 coupled to the CRM 402.

The CRM 402 and other computer readable mediums discussed in this paper are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The CRM 402 and other computer readable mediums discussed in this paper are intended to represent a variety of potentially applicable technologies. For example, the CRM 402 can be used to form a network or part of a network. Where two components are co-located on a device, the CRM 402 can include a bus or other data conduit or plane. Where a first component is co-located on one device and a second component is located on a different device, the CRM 402 can include a wireless or wired back-end network or LAN. The CRM 402 can also encompass a relevant portion of a WAN or other network, if applicable.

The devices, systems, and computer-readable mediums described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

Returning to the example of FIG. 4A, the metrics datastore 404 is intended to represent a datastore that includes time series data sets. As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

A database management system (DBMS) can be used to manage a datastore. In such a case, the DBMS may be thought of as part of the datastore, as part of a server, and/or as a separate system. A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Alpha Five, DataEase, Oracle database, IBM DB2, Adaptive Server Enterprise, FileMaker, Firebird, Ingres, Informix, Mark Logic, Microsoft Access, InterSystems Cache, Microsoft SQL Server, Microsoft Visual FoxPro, MonetDB, MySQL, PostgreSQL, Progress, SQLite, Teradata, CSQL, OpenLink Virtuoso, Daffodil DB, and OpenOffice.org Base, to name several.

Database servers can store databases, as well as the DBMS and related engines. Any of the repositories described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to a specifically programmed processor. With most DBMS implementations, there is one physical view and an almost unlimited number of logical views for the same data.

A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. An optimal structure may vary depending upon application requirements (e.g., speed, reliability, maintainability, scalability, and cost). One of the more common models in use today is the ad hoc model embedded in SQL. Data structures can include fields, records, files, objects, and any other applicable known or convenient structures for storing data. A database query language can enable users to query databases and can include report writers and security mechanisms to prevent unauthorized access. A database transaction mechanism ideally ensures data integrity, even during concurrent user accesses, with fault tolerance. DBMSs can also include a metadata repository; metadata is data that describes other data.

As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Returning to the example of FIG. 4A, the time series refinement engine 406 is intended to represent an engine that detects a discontinuity or anomaly in a time series data set and accounts for the discontinuity or anomaly. For example, the time series refinement engine 406 can refine a data set using single point refinement or episode refinement, as appropriate. An engine suitable for acting as a preprocessing engine carries out techniques described above with reference to "STAGE 0: TIME SERIES REFINEMENT (PRE-PROCESSING)."

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor that is a component of the engine. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

Referring once again to the example of FIG. 4A, the behavior diagnostics engine 408 is intended to represent an engine that detects and validates the presence of behavioral properties such as trend and seasonality. An engine suitable for acting as a behavior diagnostics engine carries out techniques described above with reference to "STAGE 1: BEHAVIOR DIAGNOSTICS."

The time series modeling engine 410 is intended to represent an engine that models time series using a relevant subset of time series modeling techniques selected by trend and seasonality combinations diagnosed by the behavior diagnostics engine 408. An engine suitable for acting as a time series modeling engine carries out techniques described above with reference to STAGE 2: TIME SERIES MODELING."

The model selection engine 412 is intended to represent an engine that comprises performance indicators for finding a best suitable forecast model according to an input data set. In a specific implementation, in order to avoid time lag, forecasting models of the time series modeling engine are made to run in parallel by the model selection engine 412 and an appropriate forecast model is ultimately selected based on the performances of the forecasting models when the parallel processes are completed. An engine suitable for acting as a model selection engine carries out techniques described above with reference to STAGE 3: MODEL SELECTION."

The forecast reporting engine 414 is intended to represent an engine that uses the model selected by the model selection engine 412 to generate a forecast. An engine suitable for acting as a model selection engine carries out techniques described above with reference to STAGE 4: FORECAST REPORTING."

Figure 4B:
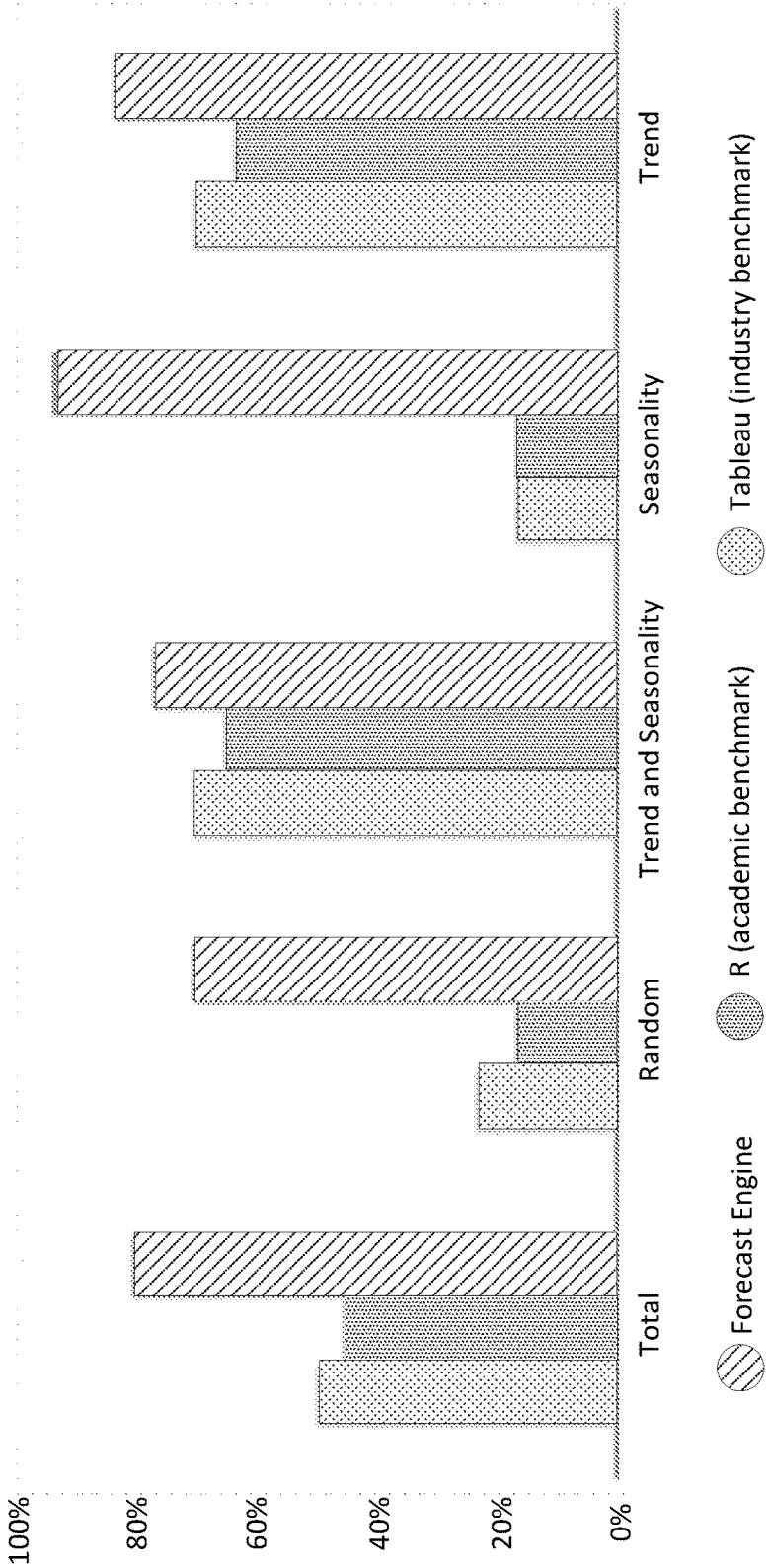
FIG. 4B depicts a graph of a comparative analysis of a time series forecast engine with benchmarks.

FIG. 4B depicts a graph of a comparative analysis of a time series forecast engine with benchmarks. Real time data that contained randomness and disturbances were inputted into the time series forecast engine. As shown in FIG. 4B, the comparative analysis indicated that the time series forecast engine outperformed when benchmarked with solutions provided by Tableau and R (a programming language for statistical analysis).

The invention claimed is:
1. A system comprising:
 a time series refinement engine coupled to a metrics datastore comprising a time series data set, wherein the time series refinement engine detects a discontinuity or anomaly episode within the time series data set and refines the time series data set to account for the detected discontinuity or anomaly episode, resulting in a refined time series;

a behavior diagnostics engine coupled to the time series refinement engine and comprising a trend diagnostic engine and a seasonality diagnostic engine, wherein the refined time series is diagnosed and validated for trends by the trend diagnostic engine and diagnosed and validated for seasonality by the seasonality diagnostic engine;

a time series modeling engine coupled to the behavior diagnostics engine, wherein the time series modeling engine models the refined time series using a set of time series models that have been determined to be applicable to the time series, to obtain a set of applicable time series models;

a model selection engine coupled to the time series modeling engine, wherein a highest performing time series model is selected from the set of applicable time series models;

a forecast reporting engine coupled to the model selection engine, wherein the forecast reporting engine generates a forecast using the highest performing time series model and provides a report that includes the forecast;

wherein the time series modeling engine uses a trend model subset of models for modeling rate of change, a seasonality model subset of models for modeling seasonal patterns, a hybrid model subset of models for modeling rate of change along with seasonal patterns, and a pseudo-random pattern model subset of models for approximating randomness, wherein:

the trend models include a subset of regression models, a subset of Explicit handling of Trend and Seasonality (ETS) models, and a subset of Auto-Regressive Integrated Moving Average (ARIMA) models;

the seasonality models include a subset of Seasonality-Trend Locally weighted scatterplot smoothing (STL) based models, a subset of ETS models, and a subset of ARIMA models;

the hybrid models include a subset of STL models, a subset of ETS models, a subset of regression models, and a subset of ARIMA models;

the pseudo-random models include an ETS model, a subset of regression models, and a subset of ARIMA models;

the trend model subset of models is selected when the refined time series includes detected trends, the seasonality model subset of models is selected when the refined time series includes detected seasonality, the hybrid model subset of models is selected when the time series includes both detected trends and detected seasonality, and the pseudo-random pattern model subset of models is selected when the time series has no identified trends or seasonality.

2. The system of claim 1 wherein the time series refinement engine detects the anomaly episode by determining the time series data set includes a rise or a fall at an unexpected time or within a time frame beyond that of white noise.

3. The system of claim 1 wherein the time series refinement engine smooths out the anomaly episode using single point refinement.

4. The system of claim 1 wherein the time series refinement engine smooths out the anomaly episode using episode refinement.

5. The system of claim 1 wherein the behavior diagnostics engine detects trend by fitting simple regression on scaled time series and validates trend using slope tolerance thresholding.

6. The system of claim 1 wherein the behavior diagnostics engine detects seasonality by generating a seasonality profile via spectral analysis of the refined time series and validates seasonality by thresholding on a rank of a trajectory matrix framed using each detected seasonality.

7. The system of claim 1 wherein the behavior diagnostics engine detects trend in the refined time series with min-max scaling and simple regression to estimate and identify a non-zero slope that indicates presence of trend, and validates trend using slope tolerance thresholding.

8. The system of claim 1 wherein the behavior diagnostics engine detects seasonality in the refined time series using a Fast Fourier Transform (FFT) to generate a seasonality profile and validates seasonality using thresholding on rank from Singular Value Decomposition (SVD) of a trajectory matrix framed using each detected seasonality.

9. The system of claim 1 wherein the model selection engine runs within a selected subset of models, wherein each model of the selected subset of models models one and only one of:
   trend and seasonality,
   trend and lack of seasonality,
   seasonality and lack of trend, and
   lack of trend and lack of seasonality.

10. The system of claim 1 wherein the model selection engine evaluates performance after running a selected subset of models to generate a suite of performance indicators selected from a group consisting of Root Mean Square Error (RMSE), Linear Error in Probability Space (LEPS), Mean Absolute Percentage Deviation (MAPD), corrected Akaike Information Criterion (AICc), Bayesian Information Criterion (BIC), and a combination of these.

11. The system of claim 1 wherein the model selection engine selects a highest performance forecast model for the refined time series after the time series modeling engine evaluates a selected subset of models.

12. A method comprising:
   detecting a discontinuity or anomaly episode within a time series data set;
   refining the time series data set to account for the detected discontinuity or anomaly episode, resulting in a refined time series;
   diagnosing the refined time series for trends;
   validating the refined time series for trends;
   diagnosing the refined time series for seasonality;
   validating the refined time series for seasonality;
   determining time series models that are applicable to the refined time series;
   modeling the refined time series using a set of time series models that have been determined to be applicable to the refined time series, to obtain a set of applicable time series models;
   selecting a highest performing time series model from the set of applicable time series models;
   generating a forecast using the highest performing time series model;
   providing a report that includes the forecast and forecast bands;
   wherein a trend model subset of models for modeling rate of change, a seasonality model subset of models for modeling seasonal patterns, a hybrid model subset of models for modeling rate of change along with seasonal patterns, and a pseudo-random pattern model subset of models for approximating randomness are used, wherein:
the trend models include a subset of regression models, a subset of Explicit handling of Trend and Seasonality (ETS) models, and a subset of Auto-Regressive Integrated Moving Average (ARIMA) models;
the seasonality models include a subset of Seasonality-Trend Locally weighted scatterplot smoothing (STL) based models, a subset of ETS models, and a subset of ARIMA models;
the hybrid models include a subset of STL models, a subset of ETS models, a subset of regression models, and a subset of ARIMA models;
the pseudo-random models include an ETS model, a subset of regression models,
and a subset of ARIMA models;
the trend model subset of models is selected when the refined time series includes detected trends, the seasonality model subset of models is selected when the refined time series includes detected seasonality, the hybrid model subset of models is selected when the time series includes both detected trends and detected seasonality, and the pseudo-random pattern model subset of models is selected when the time series has no identified trends or seasonality.

13. The method of claim 12 comprising running a selected subset of models, wherein each model of the selected subset of models models one and only one of:
trend and seasonality,
trend and lack of seasonality,
seasonality and lack of trend, and
lack of trend and lack of seasonality.

14. The method of claim 12 comprising running a selected subset of models to generate a suite of performance indicators selected from a group consisting of Root Mean Square Error (RMSE), Linear Error in Probability Space (LEPS), Mean Absolute Percentage Deviation (MAPD), corrected Akaike Information Criterion (AICc), Bayesian Information Criterion (BIC), and a combination of these.

15. The method of claim 12 comprising selecting a highest performance forecast model for the refined time series after the time series modeling engine evaluates a selected subset of models.

16. The method of claim 12 comprising determining the time series data set includes a rise or a fall at an unexpected time or within a time frame beyond that of white noise.

17. The method of claim 12 comprising smoothing out the anomaly episode using single point refinement.

18. The method of claim 12 comprising smoothing out the anomaly episode using episode refinement.

19. The method of claim 12 comprising detecting trend by fitting simple regression on scaled time series and validating trend using slope tolerance thresholding.

20. The method of claim 12 comprising detecting seasonality by generating a seasonality profile via spectral analysis of the refined time series and validating seasonality by thresholding on a rank of a trajectory matrix framed using each detected seasonality.

21. The method of claim 12 comprising detecting trend in the refined time series with min-max scaling and simple regression to estimate and identify a non-zero slope that indicates presence of trend and validating trend using slope tolerance thresholding.

22. The method of claim 12 comprising detecting seasonality in the refined time series using a Fast Fourier Transform (FFT) to generate a seasonality profile and validating seasonality using thresholding on rank from Singular Value Decomposition (SVD) of a trajectory matrix framed using each detected seasonality.

23. A system comprising:
means for detecting a discontinuity or anomaly episode within a time series data set;
means for refining the time series data set to account for the detected discontinuity or anomaly episode, resulting in a refined time series;
means for diagnosing the refined time series for trends;
means for validating the refined time series for trends;
means for diagnosing the refined time series for seasonality;
means for validating the refined time series for seasonality;
means for determining time series models that are applicable to the refined time series;
means for modeling the refined time series using a set of time series models that have been determined to be applicable to the refined time series, to obtain a set of applicable time series models;
means for selecting a highest performing time series model from the set of applicable time series models;
means for generating a forecast using the highest performing time series model;
means for providing a report that includes the forecast;
wherein the means for modeling the refined time series uses a trend model subset of models for modeling rate of change, a seasonality model subset of models for modeling seasonal patterns, a hybrid model subset of models for modeling rate of change along with seasonal patterns, and a pseudo-random pattern model subset of models for approximating randomness, wherein:
the trend models include a subset of regression models, a subset of Explicit handling of Trend and Seasonality (ETS) models, and a subset of Auto-Regressive Integrated Moving Average (ARIMA) models;
the seasonality models include a subset of Seasonality-Trend Locally weighted scatterplot smoothing (STL) based models, a subset of ETS models, and a subset of ARIMA models;
the hybrid models include a subset of STL models, a subset of ETS models, a subset of regression models, and a subset of ARIMA models;
the pseudo-random models include an ETS model, a subset of regression models, and a subset of ARIMA models;
the trend model subset of models is selected when the refined time series includes detected trends, the seasonality model subset of models is selected when the refined time series includes detected seasonality, the hybrid model subset of models is selected when the time series includes both detected trends and detected seasonality, and the pseudo-random pattern model subset of models is selected when the time series has no identified trends or seasonality.

\* \* \* \* \*